(12) United States Patent
Goetz et al.

(10) Patent No.: US 8,826,545 B2
(45) Date of Patent: Sep. 9, 2014

(54) LOPPING SHEARS

(75) Inventors: Michael Henry Goetz, Berlin, PA (US); David Wayne Miller, Fairhope, PA (US)

(73) Assignee: Robert Bosch GmbH, Stuttgart (DE)

( * ) Notice: Subject to any disclaimer, the term of this patent is extended or adjusted under 35 U.S.C. 154(b) by 695 days.

(21) Appl. No.: 12/683,497

(22) Filed: Jan. 7, 2010

(65) Prior Publication Data

US 2011/0162213 A1    Jul. 7, 2011

(51) Int. Cl.
B26B 17/02 (2006.01)
B26B 13/26 (2006.01)
A01G 3/025 (2006.01)

(52) U.S. Cl.
CPC .............. *B26B 13/26* (2013.01); *A01G 3/0251* (2013.01)
USPC .................................. 30/192; 30/254; 30/341

(58) Field of Classification Search
USPC ......... D8/5; 30/192, 211, 244, 245, 250, 252, 30/254, 341, 342, 351; 81/348, 359, 360, 81/364, 366; 7/129–134
See application file for complete search history.

(56) References Cited

U.S. PATENT DOCUMENTS

| | | | | |
|---|---|---|---|---|
| 920,202 A * | 7/1869 | McFarlane | | 30/252 |
| 148,566 A | 3/1874 | Kennedy | | |
| 157,610 A * | 12/1874 | King | | 30/192 |
| 447,185 A | 2/1891 | Hollweg | | |
| 476,459 A | 6/1892 | Hamann et al. | | |
| 573,548 A * | 12/1896 | Sours | | 30/192 |
| 640,257 A * | 1/1900 | Baer | | 30/252 |
| 694,829 A | 3/1902 | Candlish | | |
| 823,367 A * | 6/1906 | Ryan | | 30/192 |
| 863,111 A * | 8/1907 | Smohl | | 30/192 |
| 1,066,675 A * | 7/1913 | Stowell | | 30/192 |
| 1,105,191 A | 7/1914 | Flora et al. | | |
| 1,168,125 A | 1/1916 | Stowell | | |
| 1,429,792 A * | 9/1922 | Stiriss | | 30/192 |
| 1,455,297 A * | 5/1923 | Lyons et al. | | 30/192 |
| 1,502,191 A | 7/1924 | Helwig | | |
| 1,760,627 A * | 5/1930 | Bernard | | 30/192 |
| 1,897,532 A * | 2/1933 | Pilcher | | 30/192 |
| 3,230,756 A | 1/1966 | Pearson | | |
| 3,882,599 A | 5/1975 | Plum | | |
| 4,547,965 A | 10/1985 | Moore | | |
| 4,669,140 A | 6/1987 | Miceli | | |
| 5,454,165 A * | 10/1995 | Thompson et al. | | 30/249 |
| D368,634 S | 4/1996 | Frazer | | |
| 5,809,599 A | 9/1998 | Frazer | | |
| 5,963,999 A | 10/1999 | Gardiner et al. | | |
| 6,161,291 A * | 12/2000 | DiMatteo et al. | | 30/252 |

(Continued)

*Primary Examiner* — Jason Daniel Prone
(74) *Attorney, Agent, or Firm* — Maginot, Moore & Beck

(57) ABSTRACT

A lopper includes a first metal plate including a first gear structure and a first elongate extension, a second metal plate including a second gear structure in meshing engagement with said first gear structure and a second elongate extension, a first handle coupled to said first elongate extension, a second handle coupled to said second elongate extension, a link to which each of said first body and said second body is pivotably connected so that said first gear structure and said second gear structure are retained in meshing engagement, a first metal blade member having a first arm portion, a first cutting portion, and a first intermediate portion interposed between said first arm portion and said first cutting portion, and a second metal blade member having a second arm portion, a second cutting portion, and a second intermediate portion interposed between said second arm portion and said second cutting portion.

15 Claims, 7 Drawing Sheets

(56) References Cited

U.S. PATENT DOCUMENTS

| | | | |
|---|---|---|---|
| 6,422,780 B2 * | 7/2002 | Chen | 30/254 |
| 6,434,834 B2 | 8/2002 | DiMatteo et al. | |
| 6,543,958 B2 * | 4/2003 | Huang | 30/337 |
| 6,594,909 B2 * | 7/2003 | Deville | 30/341 |
| 6,789,324 B2 * | 9/2004 | Linden et al. | 30/245 |
| 6,829,829 B1 * | 12/2004 | Huang | 30/252 |
| 7,654,005 B2 * | 2/2010 | Perrin | 30/254 |
| D619,434 S * | 7/2010 | Goetz et al. | D8/5 |
| D620,771 S * | 8/2010 | Goetz et al. | D8/5 |
| D621,234 S * | 8/2010 | Goetz et al. | D8/5 |
| D622,112 S * | 8/2010 | Goetz et al. | D8/5 |
| D623,917 S * | 9/2010 | Goetz et al. | D8/57 |
| 8,136,252 B2 * | 3/2012 | Linden et al. | 30/192 |
| 8,166,659 B2 * | 5/2012 | Huang | 30/254 |
| D693,192 S * | 11/2013 | Masalin et al. | D8/5 |
| 8,584,368 B2 * | 11/2013 | Huang | 30/252 |
| 8,661,691 B2 * | 3/2014 | Huang | 30/254 |
| D702,516 S * | 4/2014 | Liu | D8/5 |
| 2001/0005941 A1 * | 7/2001 | DiMatteo et al. | 30/252 |
| 2003/0014868 A1 * | 1/2003 | Cech et al. | 30/341 |
| 2006/0277763 A1 * | 12/2006 | Turner et al. | 30/271 |
| 2009/0277018 A1 * | 11/2009 | Arena | 30/252 |
| 2010/0162575 A1 * | 7/2010 | Lin | 30/245 |
| 2011/0154668 A1 * | 6/2011 | Liu et al. | 30/252 |
| 2012/0186087 A1 * | 7/2012 | Huang | 30/252 |
| 2012/0311872 A1 * | 12/2012 | Wang | 30/252 |
| 2014/0053413 A1 * | 2/2014 | Huang | 30/250 |

* cited by examiner

LOPPING SHEARS

FIELD OF THE INVENTION

The present disclosure generally relates to cutting tools. More specifically, the present disclosure relates to lopping shears.

BACKGROUND OF RELATED ART

Lopping shears, often referred to as loppers, are typically used to cut branches and other plant growth from tress, shrubs, bushes, and other types of vegetation. In general, loppers include a cutting blade pivotally coupled to an anvil. The blade has a cutting edge for severing branches and vegetation. The anvil generally does not have a cutting edge; instead, the anvil maintains the position of the vegetation to be cut by the blade. A first handle is connected to the blade and a second handle is connected to the anvil. Movement of the handles pivots the blade and anvil between an open and a closed position.

A branch or other vegetation may be cut with loppers by pivoting the anvil and blade to the open position with the handles. In the open position a section of vegetation may be placed between the anvil and the cutting blade. When the first handle is pivoted toward the second handle, the blade pivots toward the anvil and forces the vegetation into contact with the anvil. The anvil stabilizes the position of the vegetation, and as the handles are pivoted further toward one another, the cutting edge of the blade is forced through the vegetation to sever the vegetation.

To provide a lopper having the capacity to cut easily vegetation such as thick branches, the handles of the lopper must be sufficiently long. As the length of the handles is increased, however, the handles of some known loppers may bend or otherwise become deformed. What is needed, therefore, is an improved lopping shears.

SUMMARY

According to one embodiment of the present disclosure a lopper includes a first and second metal plate, a first and second handle, a link, and a first and second metal blade. The first metal plate includes a first body having a first gear structure, and a first elongate extension extending from the first body. The second metal plate includes a second body having a second gear structure positioned in meshing engagement with the first gear structure, and a second elongate extension extending from the second body. The first handle is coupled to the first elongate extension of the first metal plate. The second handle is coupled to the second elongate extension of the second metal plate. Each of the first body and the second body is pivotably connected to the link so that the first gear structure and the second gear structure are retained in meshing engagement with each other. The first metal blade member includes a first arm portion, a first cutting portion defining a first cutting surface, and a first intermediate portion interposed between the first arm portion and the first cutting portion. A second metal blade member includes a second arm portion, a second cutting portion defining a second cutting surface, and a second intermediate portion interposed between the second arm portion and the second cutting portion. The first arm portion of the first metal blade member is pivotably connected to the first body of the first metal plate. The second arm portion of the second metal blade member is pivotably connected to the second body of the second metal plate. The first intermediate portion of the first metal blade is pivotably connected to the second intermediate portion of the second metal blade. Movement of the first handle with respect to the second handle causes movement of the first cutting portion with respect to the second cutting portion.

According to another embodiment of the present disclosure a lopper includes a first and second metal structure, a first and second handle, a link, and a first and second metal blade. The first metal structure includes a first body having a first gear structure, and a first elongate extension extending from the first body. The second metal structure includes a second body having a second gear structure positioned in meshing engagement with the first gear structure, and a second elongate extension extending from the second body. The first handle is coupled to the first elongate extension of the first metal structure. The second handle is coupled to the second elongate extension of the second metal structure. Each of the first body and the second body is pivotably connected to the link so that the first gear structure and the second gear structure are retained in meshing engagement with each other. The first metal blade member includes a first arm portion, a first cutting portion defining a first cutting surface, and a first intermediate portion interposed between the first arm portion and the first cutting portion. The second metal blade member includes a second arm portion, a second cutting portion defining a second cutting surface, and a second intermediate portion interposed between the second arm portion and the second cutting portion. The first arm portion of the first metal blade member is pivotably connected to the first body of the first metal structure. The second arm portion of the second metal blade member is pivotably connected to the second body of the second metal structure. The first intermediate portion of the first metal blade is pivotably connected to the second intermediate portion of the second metal blade. Movement of the first handle with respect to the second handle causes the first metal structure to move with respect to the second metal structure. Movement of the first metal structure with respect to the second metal structure causes the first cutting portion to move with respect to the second cutting portion.

BRIEF DESCRIPTION OF THE FIGURES

Features of the present invention will become apparent to those skilled in the art from the following description with reference to the drawings, in which.

Corresponding reference numerals and characters indicate corresponding parts throughout the several figure views.

DETAILED DESCRIPTION

For the purpose of promoting an understanding of the principles of the device described herein, reference is made to the embodiments illustrated in the figures and described in the following written specification. It is understood that no limitation to the scope of the device is thereby intended. It is further understood that the device includes any alterations and modifications to the illustrated embodiments and includes further applications of the principles of the device as would normally occur to one skilled in the art to which this device pertains.

Figure 1:
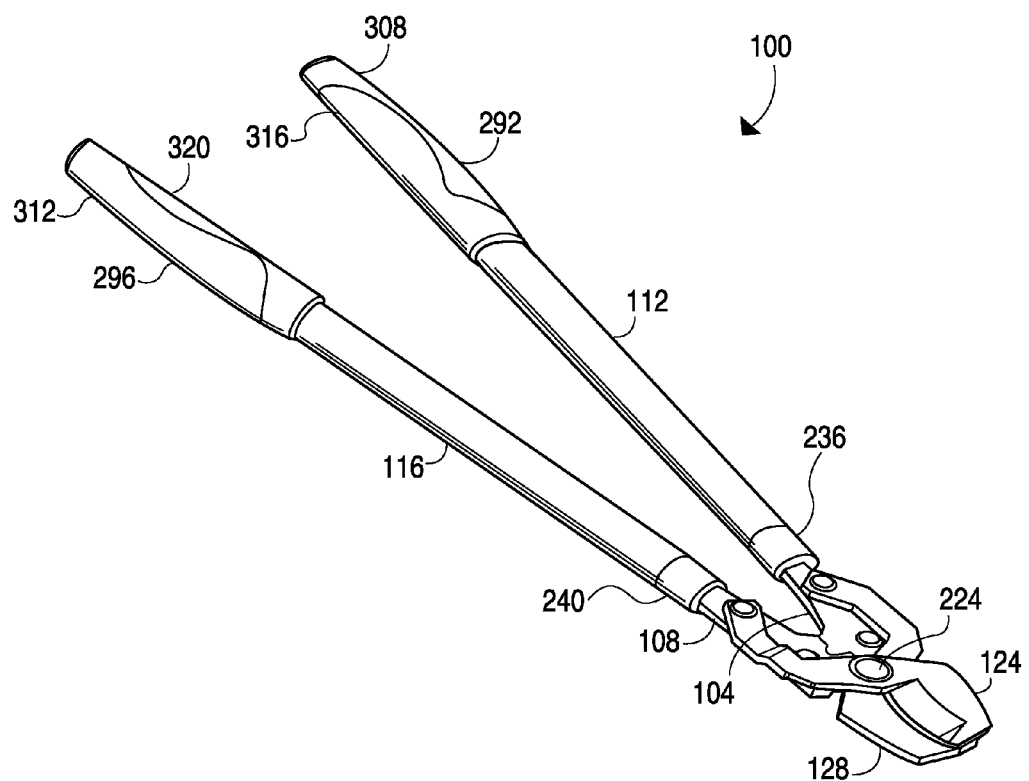
FIG. 1 depicts a perspective view of an embodiment of the lopping shears described herein.
Figure 2:
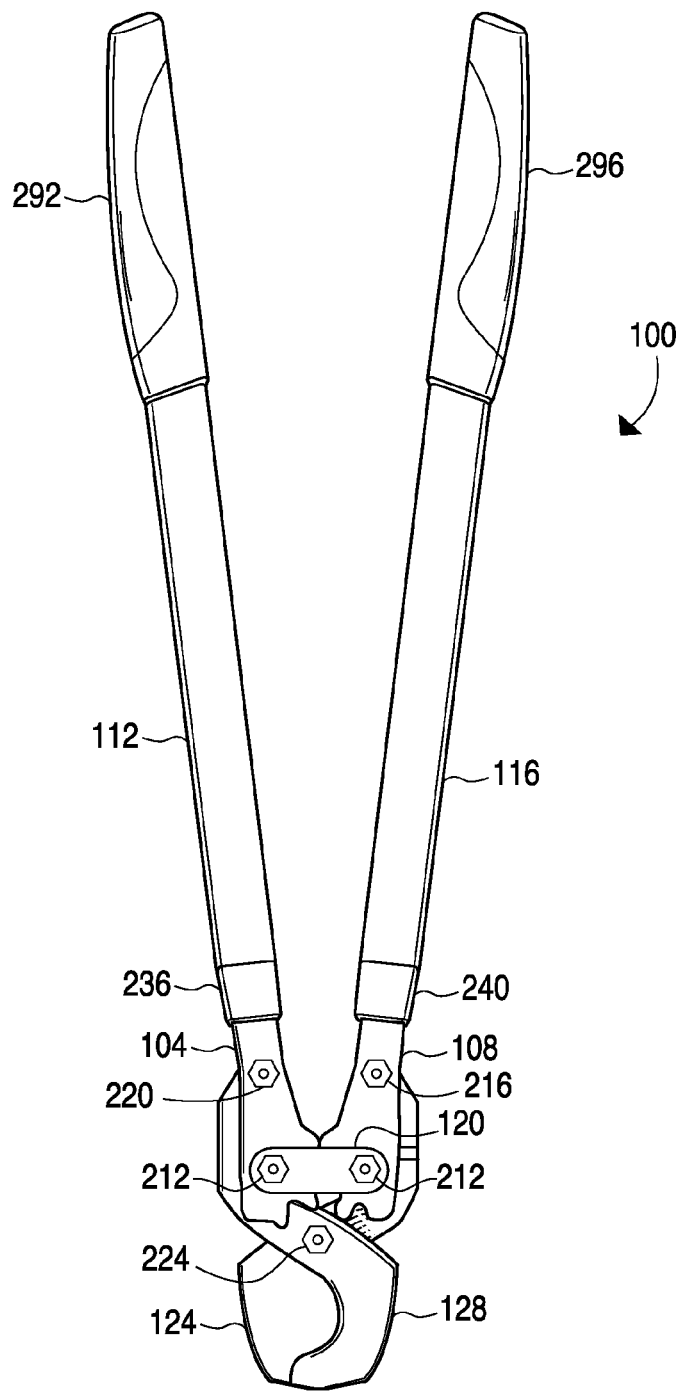
FIG. 2 depicts a bottom plan view of the lopping shears of FIG. 1, with the lopping shears shown in a closed position.
Figure 3:
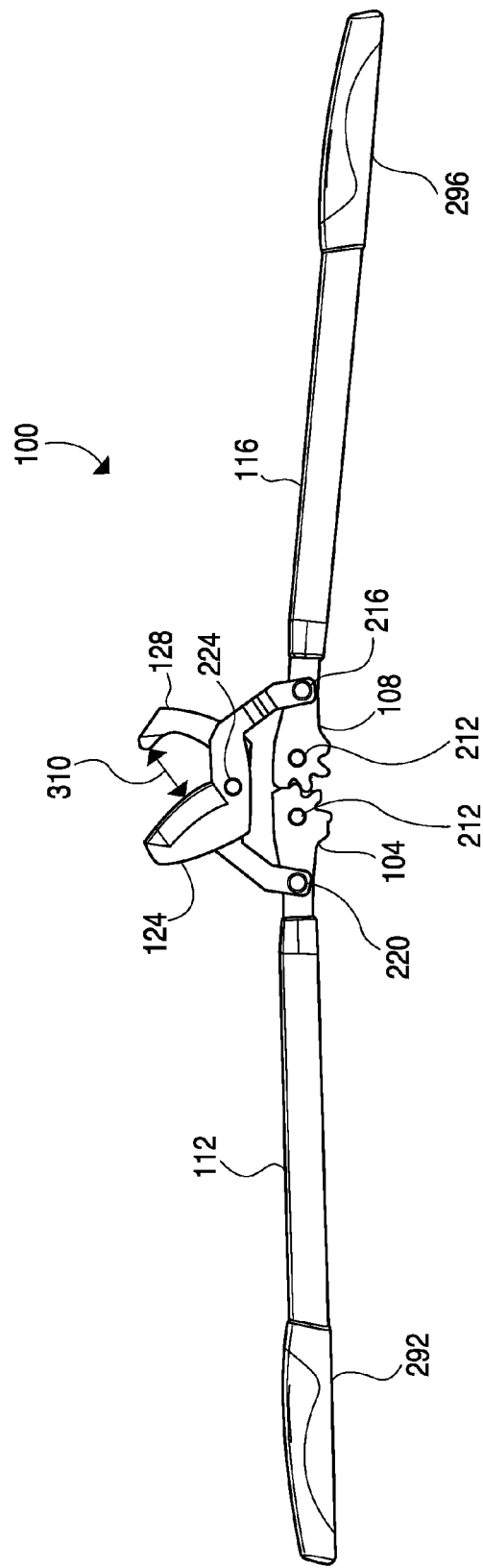
FIG. 3 depicts a top plan view of the lopping shears of FIG. 1, with the lopping shears shown in an open position.

A lopper 100, as disclosed herein, is depicted in FIG. 1. The lopper 100 is configured to cut vegetation. As used herein, the term "vegetation" includes tree branches, bushes, plants, and the like. The lopper 100 includes a plate 104, a plate 108, a handle 112, a handle 116, a link 120 (FIG. 2), a blade 124, and a blade 128. The handle 112 is connected to the plate 104, and the handle 116 is connected to the plate 108. The blade 124 is pivotally coupled to the plate 108, and the blade 128 is pivotally coupled to the plate 104. Additionally, the blade 124 is pivotally coupled to the blade 128. The link 120, as shown in FIG. 2, pivotally couples the plate 104 to the plate 108. When the handles 112, 116 are separated from one another the blades 124, 128 pivot to an open position (FIG. 3). When the handles 112, 116 are moved toward one another the blades 124, 128 pivot to a closed position (FIGS. 1 and 2). The blades 124, 128 cut vegetation when the handles 112, 116 are moved from the open position to the closed position.

Figure 4:
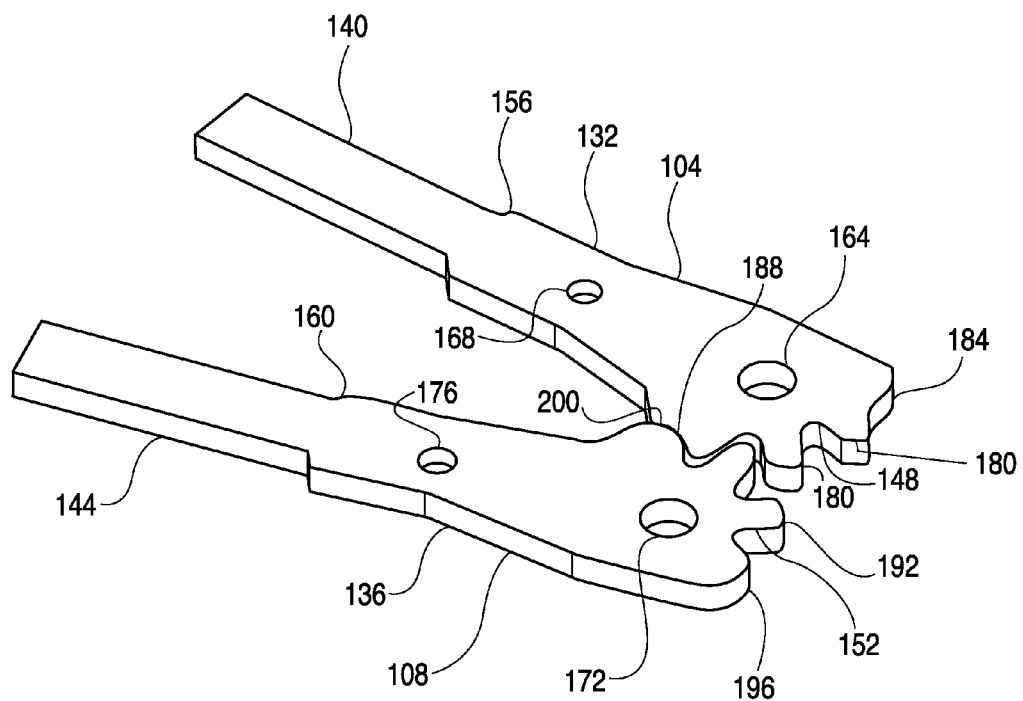
FIG. 4 depicts a perspective view of a pair of plates of the lopping shears of FIG. 1.

The plates 104, 108, shown isolated from the lopper 100 in FIG. 4, are generally flat and have a uniform thickness. Preferably, the plates 104, 108 are made of a steel material. Each plate 104, 108 includes a body 132, 136, an elongate extension 140, 144, and a gear structure 148, 152. The elongate extension 140 is connected to an end portion of the body 132, and the elongate extension 144 is connected to an end portion of the body 136. The elongate extensions 140, 144 have a generally uniform width. Each plate 104, 108 defines a shoulder 156, 160 at the junction of the body 132, 136 and the elongate extension 140, 144. The plate 104 includes an opening 164 and an opening 168, and the plate 108 includes an opening 172 and an opening 176. As described below, fastening apparatus extend through the openings 168, 176 to couple the blades 124, 128 to the plates 104, 108. Fastening apparatus also extend through openings 164, 172 and to couple the plate 104 to the plate 108. Each gear structure 148, 152 is connected to an end portion of the body 132, 136. The gear structure 148 includes teeth 180 that extend from a stop 184 to a stop 188. The gear structure 152 includes teeth 192 that extend from a stop 196 to a stop 200. The teeth 180 are offset from the teeth 192 to enable the gear structure 148 and the gear structure 152 to engage meshingly after being coupled together by the link 120. The plates 104, 108 are shown with the gear structures 148, 152 meshingly engaged in FIG. 4.

Figure 5:
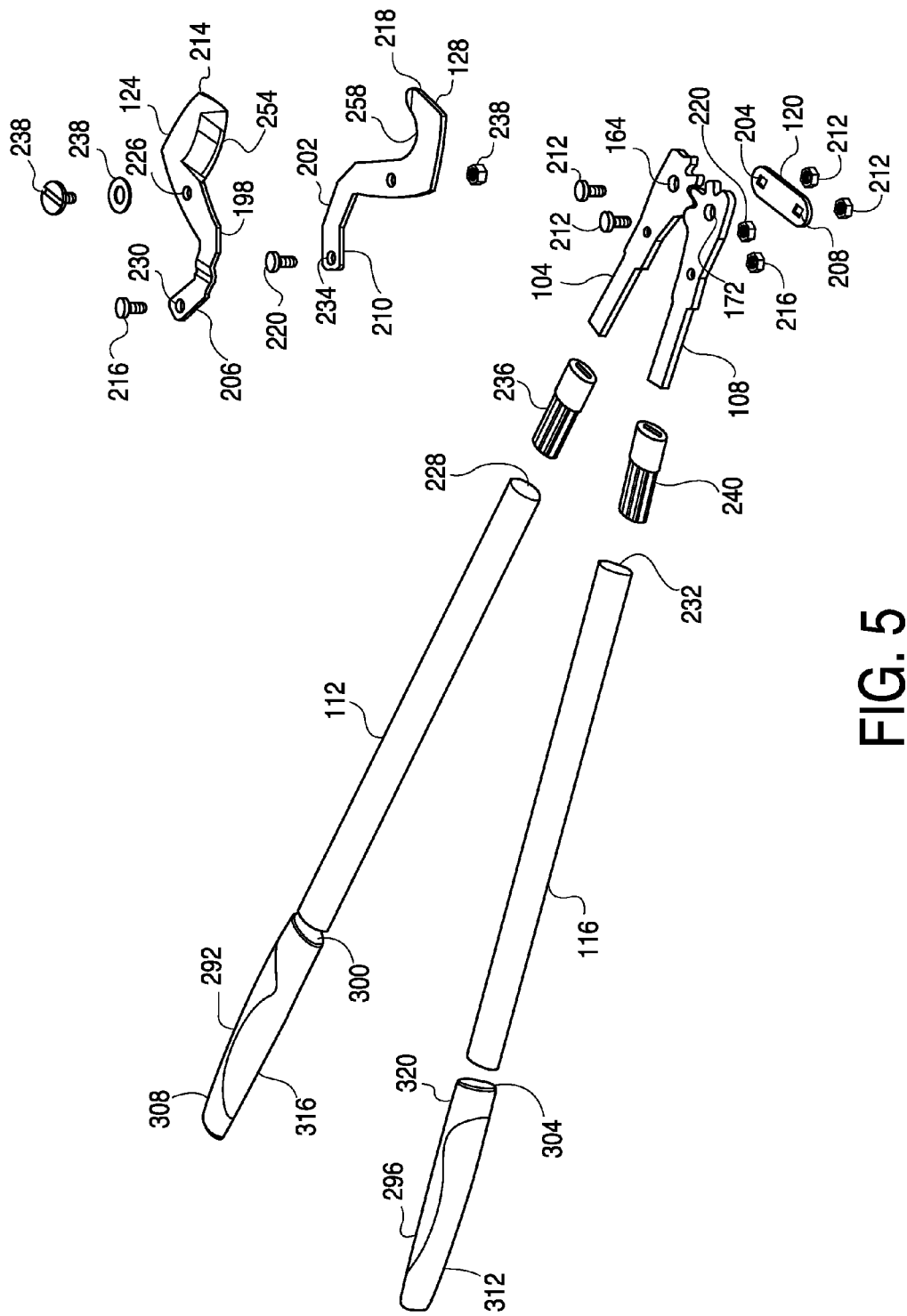
FIG. 5 depicts an exploded perspective view of the lopping shears of FIG. 1.

Referring again to FIG. 2, the link 120 is pivotally coupled to the plates 104, 108. The link 120 is generally flat and, as shown in FIG. 5, includes an opening 204 positioned to align with the opening 164 and an opening 208 positioned to align with the opening 172. The fastening apparatus 212, such as nuts and bolts, extend through the openings 164, 172, 204, 208 to couple pivotally the plates 104, 108 to the link 120. The link 120 keeps the gear structure 148 meshingly engaged with the gear structure 152 as the plates 104, 108 pivot from a closed position in which the stop 188 contacts the stop 200 to an open position in which the stop 184 contacts the stop 196.

The blade 124 and the blade 128 cooperate to cut vegetation when the handles 112, 116 are moved toward one another. Preferably, the blades 124, 128 are made of a steel material. As shown in FIG. 5, the each blade 124, 128 includes an intermediate portion 198, 202 interposed between an arm portion 206, 210, and a cutting portion 214, 218. The blade 124 is pivotally connected to the body 136 of the plate 108 with a fastening apparatus 216, such as a nut and bolt, that extends through an opening 230 in the arm portion 206 and opening 176. Similarly, the blade 128 is pivotally connected to the body 132 of plate 104 with a fastening apparatus 220, such as a nut and bolt, that extends through an opening 234 in the arm portion 210 and opening 168. The intermediate portion 198 is pivotally connected to the intermediate portion 202 at pivot point 224 (FIG. 1) with a fastening apparatus 238 (FIG. 5), such as a nut, bolt, and washer, that extends through the openings 226. In one embodiment, each cutting portion 214, 218 includes a cutting edge 254, 258 configured to sever vegetation. In another embodiment, the cutting portion 218 is a hook or anvil that does not have a cutting edge, but instead stabilizes vegetation as the cutting edge 254 of blade 124 severs the vegetation. In each embodiment, the cutting portion 254 moves with respect to the cutting portion 258 in response to movement of the handles 112, 116.

The blades 124, 128 include a non-stick coating. In particular, the blade 124 includes a black non-stick coating and the blade 128 includes a gray non-stick coating. The non-stick coating prevents vegetation excretions, such as sap and the like, from binding the blades 124, 128. Furthermore, the contrasting colors of the non-stick coatings provide a visual indication of the motion of the blade 124 relative the blade 128. In an exemplary embodiment, the non-stick coating is polytetrafluoroethylene or another synthetic fluoropolymer of tetrafluoroethylene.

As shown in FIG. 5, the handles 112, 116 are generally cylindrical in shape. An aluminum material may be used to form the handles 112, 116. In particular, the handles 112, 116 may be extruded aluminum or rolled aluminum sheet. The handles 112, 116 are strong enough to force the blades 124, 128 through tough vegetation, but light enough to prevent user fatigue. In one embodiment, the handles 112, 116 are approximately twenty inches long, to provide enough leverage to force the blades 124, 128 through tough vegetation, such as dead branches, without an excessive force being exerted upon the handles 112, 116. The handles 112, 116 remain rigid during usage. In particular, the handles 112, 116 do not bend to a significant degree in response to being forced through tough vegetation.

The handle 112 defines a cavity 228 and the handle 116 defines a cavity 232. The cavity 228 extends from a first end of the handle 112 to a second end of the handle 112. The cavity 232 extends from a first end of the handle 116 to a second end of the handle 116. Elongate extension 140 is coupled to handle 112 in cavity 228. Similarly, elongate extension 144 is coupled to handle 116 in cavity 232. The elongate extensions 140, 144 extend deeply into the cavities 228, 232 to couple the handles 112, 116 to the plates 104, 108 securely. In particular, the elongate extensions 140, 144 extend within the cavities 228, 232 to a depth that prevents the elongate extensions 140, 144 from bending, or otherwise becoming deformed, as a result of the forces exerted upon the handles 112, 116.

Figure 6:
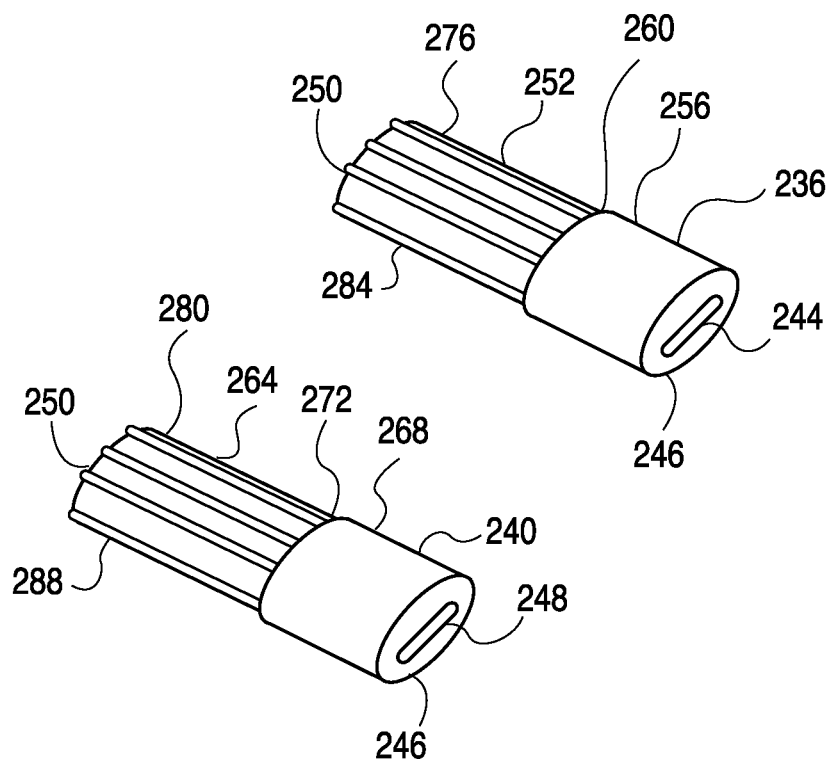
FIG. 6 depicts a perspective view of a pair of inserts of the lopping shears of FIG. 1.

The lopper 100 includes inserts 236, 240 to couple the plates 104, 108 to the handles 112, 116. With reference to FIG. 6, the inserts 236, 240 are illustrated isolated from the lopper 100. The insert 236 defines a passageway 244 and the insert 240 defines a passageway 248. The passageways 244, 248, shown in phantom in FIG. 6, are configured to couple the plates 104, 108 to the handles 112, 116. In particular, the passageways 244, 248 are configured to receive the elongate extensions 140, 144. The passageways 244, 248 may extend from an end 246 of the inserts 236, 240 to an opposite end 250 of the inserts 236, 240. Alternatively, the passageways 244, 248 may terminate before the end 250. Each shoulder 156, 160 abuts an end 246 of an insert 236, 240.

The exterior dimensions of the inserts 236, 240 are approximately the same as the interior dimensions of the cavities 228, 232, such that the inserts 236, 240 become coupled to the handles 112, 116 upon being inserted into the cavities 228, 232. Similarly, the exterior dimensions of the elongate extensions 140, 144 are approximately the same as the interior dimensions of the passageways 244, 248, such that the plates 104, 108 become securely coupled to the inserts 236, 240 after being inserted into the passageways 244, 248. Accordingly, the elongate extensions 140, 144 are positioned in both the cavities 228, 232 and the passageways 244, 248. An adhesive may be provided to secure further the inserts 236, 240 to the handles 112, 116, and also to secure further the plates 104, 108 to the inserts, 236, 240.

The insert 236 includes a reduced diameter portion 252 separated from an increased diameter portion 256 by a shoulder 260. Likewise, the insert 240 includes a reduced diameter portion 264 separated from an increased diameter portion 268 by a shoulder 272. The reduced diameter portions 252, 264 are each located within a cavity 228, 232. Each shoulder 260, 272 abuts an end of a handle 112, 116. The increased diameter portions 256, 268 extend from the cavities 228, 232.

The reduced diameter portions 252, 264 of the inserts 236, 240 each include a ribbed periphery 276, 280, as shown in FIG. 6. The ribbed peripheries 276, 280 include a plurality of resilient ribs 284, 288 that extend radially from the reduced diameter portions 252, 264. The ribs 284, 288 are configured to flex, bend, or otherwise move when the reduced diameter portions 252, 264 are inserted into the cavities 228, 232. The resiliency of the ribs 284, 288 securely connects the inserts 236, 240 to the handles 112, 116.

With reference to FIG. 5, the lopper 100 includes elastic grips 292, 296. The elastic grip 292 defines a cavity 300, and the elastic grip 296 defines a cavity 304. An end of the handle 112 is configured to fit within the cavity 300, and an end of the handle 116 is configured to fit within the cavity 304. The elastic grips 292, 296 include an elastic portion 308, 312 that is overmolded upon a plastic portion 316, 320. The plastic portions 316, 320 are preferably made from glass-filled nylon. The elastic portions 308, 312 provide a soft comfort grip. In one embodiment, the elastic portions 308, 312 are made from a soft thermoplastic elastomer material.

In operation, the lopper 100 may be used to cut vegetation, and the like. To cut vegetation the handles 112, 116 are moved to the open position, as illustrated in FIG. 3. The handles 112, 116 may be moved to the open position by grasping the elastic grips 292, 296 and pivoting the handles 112, 116 away from each other. As the handles 112, 116 are pivoted away from each other the plate 104 pivots about opening 164 and the plate 108 pivots about the opening 172. As the plates 104, 108, pivot the gear structure 148 and the gear structure 152 meshingly engage until the stop 184 contacts the stop 196. Movement of the handles 112, 116 also causes the blade 124 and the blade 128 to pivot about pivot point 224. In the open position, the blade 124 is separated from the blade 128 by a distance 310, as shown in FIG. 3. In one embodiment, the distance 310 is at least two inches, thereby enabling vegetation having a diameter or a width of up to two inches to be placed between the blades 124, 128 to be cut by the lopper 100.

Figure 7:
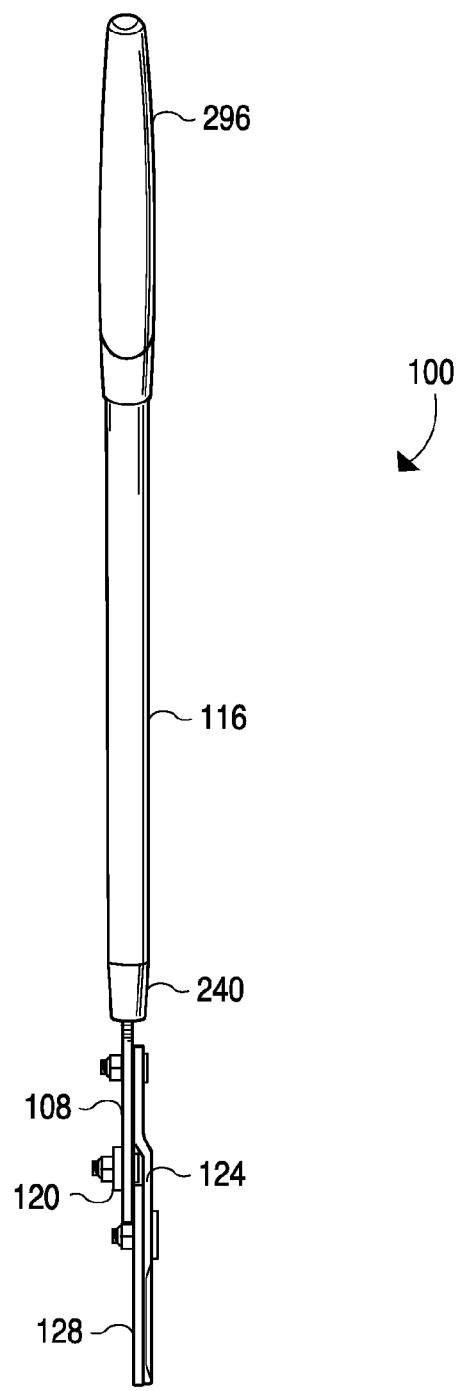
FIG. 7 depicts a side elevational view of the lopping shears of FIG. 1, with the lopping shears shown in a closed position.

The lopper 100 cuts vegetation as the handles 112, 116 are moved to the closed position. In particular, as the handles 112, 116 are moved to the closed position the blade 124 and the blade 128 pivot toward one another about pivot point 224. Continued movement of the handles 112, 116 to the closed position causes the blade 128 to stabilize the vegetation as the blade 124 is pushed through the vegetation. The length of the handles 112, 116 and the mechanical advantage provided by the gear structures 148, 152 enables the lopper 100 to cut dense vegetation. As shown in FIG. 7, the lopper 100 is narrow in profile enabling the lopper 100 to be operated in a relatively confined area.

The device described herein has been illustrated and described in detail in the figures and foregoing description, the same should be considered as illustrative and not restrictive in character. It is understood that only the preferred embodiments have been presented and that all changes, modifications, and further applications that come within the spirit of the device described herein are desired to be protected.

What is claimed is:

1. A lopper, comprising:
    a first metal plate including (i) a first body having a first gear structure disposed at an end of the first body, said first gear structure including first teeth and a first stop, (ii) a first elongate extension extending from said first body, and (iii) said first body, said first teeth, and said first elongate extension include a generally flat and uniform thickness;
    a second metal plate including (i) a second body having a second gear structure disposed at an end of the second body, said second gear structure including second teeth positioned in meshing engagement with said first teeth of said first gear structure, and a second stop, and (ii) a second elongate extension extending from said second body, and (iii) said second body, said second teeth, and said second elongate extension include a generally flat and uniform thickness;
    a first handle coupled to said first elongate extension of said first metal plate, wherein said first elongate extension is centrally disposed along a first longitudinal axis of said first handle;
    a second handle coupled to said second elongate extension of said second metal plate, wherein said second elongate extension is centrally disposed along a second longitudinal axis of said second handle;
    a link to which each of said first body and said second body is pivotably connected so that said first teeth of said first gear structure and said second teeth of said second gear structure are retained in said meshing engagement with each other, and wherein said first body and said second body are aligned along a same plane and said link is disposed on a first side of said first body and second body;
    a first metal blade member having (i) a first arm portion, (ii) a first cutting portion defining a first cutting surface, and (iii) a first intermediate portion interposed between said first arm portion and said first cutting portion, wherein said first metal blade member is disposed on a second side of said first body and second body; and
    a second metal blade member having (i) a second arm portion, (ii) a second cutting portion defining a second cutting surface, and (iii) a second intermediate portion interposed between said second arm portion and said second cutting portion, wherein said second metal blade member is disposed on said second side of said first body and second body,
    wherein said first arm portion of said first metal blade member is pivotably connected to said first body of said first metal plate,
    wherein said second arm portion of said second metal blade member is pivotably connected to said second body of said second metal plate, wherein said first intermediate portion of said first metal blade is pivotably connected to said second intermediate portion of said second metal blade, wherein movement of said first handle with respect to said second handle causes movement of said first cutting portion with respect to said second cutting portion, wherein said movement of said first handle with respect to said second handle causes said first stop to contact said second stop to thereby prevent further movement of said first cutting portion with respect to said cutting portion when in an open position in which said first metal blade member and said second metal blade member are in spaced relation with said first teeth and said second teeth and said first cutting portion and second cutting portion are in spaced relation to each other by a distance sized to receive vegetation to be severed.

2. The lopper of claim 1, wherein each of said first metal plate and said second metal plate are made of a steel material.

3. The lopper of claim 2, wherein each of said first handle and said second handle are made of an aluminum material.

4. The lopper of claim 1, further comprising (i) a first insert defining a first passageway, said first insert having a first reduced diameter portion and a first increased diameter portion, and (ii) a second insert defining a second passageway, said second insert having a second reduced diameter portion and a second increased diameter portion, wherein:

said first handle defines a first cavity disposed along said first longitudinal axis of said first handle, said second handle defines a second cavity disposed along said second longitudinal axis of said second handle, said first reduced diameter portion of said first insert is located within said first cavity while said first increased diameter portion of said first insert is located outside of said first cavity, said second reduced diameter portion of said second insert is located within said second cavity while said second increased diameter portion of said second insert is located outside of said second cavity, said first elongate extension of said first metal plate is located in both said first passageway and said first cavity, and said second elongate extension of said second metal plate is located in both said second passageway and said second cavity.

5. The lopper of claim 4, wherein:

said first reduced diameter portion of said first insert possesses a first ribbed outer periphery, said second reduced diameter portion of said second insert possesses a second ribbed outer periphery, said first ribbed outer periphery is positioned within said first cavity of said first handle, and said second ribbed outer periphery is positioned within said second cavity of said second handle.

6. The lopper of claim 5, wherein:

said first increased diameter portion of said first insert defines a first end of said first insert, said second increased diameter portion of said second insert defines a second end of said second insert, said first metal plate defines a first shoulder located at a first interface of said first body and said first elongate extension, said second metal plate defines a second shoulder located at a second interface of said second body and said second elongate extension, said first end is positioned in contact with said first shoulder, and said second end is positioned in contact with said second shoulder.

7. The lopper of claim 5, further comprising:
a first elastic grip defining a third cavity; and
a second elastic grip defining a fourth cavity,
wherein said first handle includes a first distal handle portion located within said third cavity of said first elastic grip, and
wherein said second handle includes a second distal handle portion located within said fourth cavity of said second elastic grip.

8. A lopper, comprising:
a first metal structure including (i) a first body having a first gear structure disposed at an end of the first body, said first gear structure including first teeth and a first stop, (ii) a first elongate extension extending from said first body, and (iii) said first body, said first teeth, and said first elongate extension include a generally flat and uniform thickness;

a second metal structure including (i) a second body having a second gear structure disposed at an end of the second body, said second gear structure including second teeth positioned in meshing engagement with said first teeth of said first gear structure, and a second stop, and (ii) a second elongate extension extending from said second body, and (iii) said second body, said second teeth, and said second elongate extension include a generally flat and uniform thickness;

a first handle coupled to said first elongate extension of said first metal structure, wherein said first elongate extension is centrally disposed along a first longitudinal axis of said first handle;

a second handle coupled to said second elongate extension of said second metal structure, wherein said second elongate extension is centrally disposed along a second longitudinal axis of said second handle;

a link to which each of said first body and said second body is pivotably connected so that said first gear structure and said second gear structure are retained in said meshing engagement with each other, and wherein said first body and said second body are aligned along a same plane and said link is disposed on a first side of said first body and second body;

a first metal blade member having (i) a first arm portion, (ii) a first cutting portion defining a first cutting surface, and (iii) a first intermediate portion interposed between said first arm portion and said first cutting portion, wherein said first metal blade member is disposed on a second side of said first body and second body; and a second metal blade member having (i) a second arm portion, (ii) a second cutting portion defining a second cutting surface, and (iii) a second intermediate portion interposed between said second arm portion and said second cutting portion, wherein said second metal blade member is disposed on said second side of said first body and second body, wherein said first arm portion of said first metal blade member is pivotably connected to said first body of said first metal structure, wherein said second arm portion of said second metal blade member is pivotably connected to said second body of said second metal structure, wherein said first intermediate portion of said first metal blade is pivotably connected to said second intermediate portion of said second metal blade, wherein movement of said first handle with respect to said second handle causes said first metal structure to move with respect to said second metal structure, wherein said movement of said first metal structure with respect to said second metal structure causes said first cutting portion to move with respect to said second cutting portion, wherein said movement of said first metal structure with respect to said second metal structure causes said first stop to contact said second stop to thereby prevent further movement of said first cutting portion with respect to said second cutting portion when in an open position in which said first metal blade member and said second metal blade member are in spaced relation with said first teeth and said second teeth and said first cutting portion and second cutting portion are in spaced relation to each other by a distance sized to receive vegetation to be severed.

9. The lopper of claim 8, wherein each of said first metal structure and said second metal structure are made of a steel material.

10. The lopper of claim 9, wherein each of said first handle and said second handle are made of an aluminum material.

11. The lopper of claim 8, further comprising (i) a first insert defining a first passageway, said first insert having a first reduced diameter portion and a first increased diameter portion, and (ii) a second insert defining a second passageway, said second insert having a second reduced diameter portion and a second increased diameter portion, wherein:

said first handle defines a first cavity disposed along said first longitudinal axis of said first handle, said second handle defines a second cavity disposed along said second longitudinal axis of said second handle, said first reduced diameter portion of said first insert is located within said first cavity while said first increased diameter portion of said first insert is located outside of said first cavity, said second reduced diameter portion of said second insert is located within said second cavity while said second increased diameter portion of said second insert is located outside of said second cavity, said first elongate extension of said first metal structure is located in both said first passageway and said first cavity, and said second elongate extension of said second metal structure is located in both said second passageway and said second cavity.

12. The lopper of claim 11, wherein:

said first reduced diameter portion of said first insert possesses a first ribbed outer periphery, said second reduced diameter portion of said second insert possesses a second ribbed outer periphery, said first ribbed outer periphery is positioned within said first cavity of said first handle, and said second ribbed outer periphery is positioned within said second cavity of said second handle.

13. The lopper of claim 12, wherein:

said first increased diameter portion of said first insert defines a first end of said first insert, said second increased diameter portion of said second insert defines a second end of said second insert, said first metal structure defines a first shoulder located at a first interface of said first body and said first elongate extension, said second metal structure defines a second shoulder located at a second interface of said second body and said second elongate extension, said first end is positioned in contact with said first shoulder, and said second end is positioned in contact with said second shoulder.

14. The lopper of claim 12, further comprising:

a first elastic grip defining a third cavity; and a second elastic grip defining a fourth cavity, wherein said first handle includes a first distal handle portion located within said third cavity of said first elastic grip, and wherein said second handle includes a second distal handle portion located within said fourth cavity of said second elastic grip.

15. The lopper of claim 8, wherein said first teeth of said first gear structure and said second teeth of said second gear structure are meshingly engaged during said movement of said first metal structure with respect to said second metal structure.

* * * * *